(12) United States Patent
Hagemes et al.

(10) Patent No.: US 6,739,788 B1
(45) Date of Patent: May 25, 2004

(54) BALL PIVOT

(75) Inventors: Jörg Hagemes, Osnabrück (DE); Martina Beyer, Puhlheim (DE)

(73) Assignee: ZF Lemförder Metallwaren AG, Lemförde (DE)

( * ) Notice: Subject to any disclaimer, the term of this patent is extended or adjusted under 35 U.S.C. 154(b) by 0 days.

(21) Appl. No.: 09/524,354

(22) Filed: Mar. 13, 2000

(30) Foreign Application Priority Data

Oct. 31, 1997 (DE) .......................... 197 48 117

(51) Int. Cl.⁷ .......................... F16C 11/06; B62D 9/06
(52) U.S. Cl. .................. 403/122; 403/27; 280/93.511; 280/124.145; 280/124.154
(58) Field of Search .............................. 403/122, 123, 403/126, 114, 115, 128, 131, 56, 90, 22, 27; 280/93.511, 124.145, 124.154

(56) References Cited

U.S. PATENT DOCUMENTS

| | | | | |
|---|---|---|---|---|
| 2,392,063 A | * | 1/1946 | Reimann et al. | 403/122 |
| 2,533,928 A | * | 12/1950 | Graham | 403/126 |
| 2,549,178 A | * | 4/1951 | Dear | 403/133 X |
| 3,825,356 A | | 7/1974 | Cook, Jr. | |
| 3,826,514 A | * | 7/1974 | Kolbe | 280/124.103 |
| 4,052,804 A | * | 10/1977 | Stedman | 280/124.112 |
| 4,118,134 A | | 10/1978 | Mansel | |
| 4,131,957 A | | 1/1979 | Bokros | |
| 4,159,832 A | * | 7/1979 | Inbody | 403/115 X |
| 4,162,859 A | * | 7/1979 | McAfee | 403/122 |
| 4,213,631 A | * | 7/1980 | Wilkerson | 280/86.752 |
| 4,453,733 A | * | 6/1984 | Sautter et al. | 280/86.75 |
| 4,463,590 A | | 8/1984 | Theobald | |
| 4,492,488 A | * | 1/1985 | Warshawsky | 403/115 X |
| 4,543,812 A | | 10/1985 | Theobald | |
| 4,550,926 A | * | 11/1985 | MacIsaac | 280/5.509 |
| 4,889,356 A | * | 12/1989 | Morris | 403/131 X |
| 4,938,496 A | * | 7/1990 | Thomas et al. | 403/194 X |
| 5,004,257 A | * | 4/1991 | MacIsaac | 280/5.507 |
| 5,453,139 A | | 9/1995 | Gallagher, Jr. | |
| 5,560,103 A | | 10/1996 | Harris et al. | |
| 5,611,635 A | * | 3/1997 | Schutt et al. | 403/122 X |
| 5,626,433 A | * | 5/1997 | Iwamoto | 403/122 X |
| 5,685,267 A | * | 11/1997 | Wixzynski et al. | 123/197.3 |
| 5,700,026 A | * | 12/1997 | Zalewski et al. | 280/704 |
| 6,047,789 A | * | 4/2000 | Iwanaga | 280/93.511 |
| 6,076,840 A | * | 6/2000 | Kincaid et al. | 403/122 X |
| 6,113,303 A | * | 9/2000 | Buhl et al. | 403/122 X |

FOREIGN PATENT DOCUMENTS

| | | | | |
|---|---|---|---|---|
| CA | 535 813 | | 1/1953 | |
| DE | 489 037 | | 12/1929 | |
| DE | 381 | | 3/1952 | |
| DE | GM 16 75 000 | | 4/1954 | |
| DE | 928987 | * | 5/1955 | ............... 403/122 |
| DE | GM 17 08 040 | | 10/1955 | |
| DE | AS 1 105 292 | | 4/1961 | |
| DE | GM 18 54 243 | | 2/1962 | |
| DE | 2 210 871 | | 9/1973 | |
| DE | 35 05 755 A1 | | 9/1985 | |
| DE | 44 01 639 C2 | | 4/1997 | |
| DE | 44 03 584 C2 | | 9/1997 | |
| DE | 19748117 A1 | * | 5/1999 | |
| EP | 0 703 373 A2 | | 3/1996 | |
| FR | 1 089 717 | | 3/1955 | |
| GB | 406438 A1 | * | 3/1934 | |
| GB | 1 020 671 | | 2/1966 | |

* cited by examiner

Primary Examiner—Anthony Knight
Assistant Examiner—Ernesto Garcia
(74) Attorney, Agent, or Firm—McGlew and Tuttle, P.C.

(57) ABSTRACT

A ball pivot (1) of a ball-and-socket joint for motor vehicles with a joint ball (2) and with a pivot (3) connected to the joint ball (2) is presented, in which a substantial part (3.1) of the pivot (3) is made nonround for preventing the ball pivot from rotating. A wheel suspension is also disclosed in which a nonround ball pivot is used.

20 Claims, 9 Drawing Sheets

BALL PIVOT

FIELD OF THE INVENTION

The present invention pertains to a ball pivot of a ball-and-socket joint for motor vehicles with a joint ball and with a pivot connected to the joint ball. The present invention also pertains to a wheel suspension of a motor vehicle for the spring-loaded connection of at least one wheel to the frame or the chassis of the motor vehicle with at least one shock-absorbing strut and at least one suspension.

BACKGROUND OF THE INVENTION

Such a ball pivot of a ball-and-socket joint for motor vehicles has been known from, e.g., the Patent DE 44 03 584 C2. With the design features according to the preamble, these ball pivots are frequently used in highly stressed ball-and-socket joints in chassis of motor vehicles and have been manufactured in large numbers by the corresponding manufacturers for decades. The ball pivot comprises a joint ball and an essentially cylindrical pivot pin connected thereto. The pivot pin is provided with threads over at least a substantial part of its length, so that the ball pivot can be introduced with the pivot into an opening of a component of the motor vehicle intended for this purpose in order to be fastened to the pivot pin by means of a nut screwed onto the pivot pin. A support surface, with which the pivot pin is supported against the pressing force of the nut screwed onto the thread, is usually provided on the side of the joint ball.

If the above-described nut is to be tightened or loosened during the mounting or removal of the ball pivot, it is necessary to fix the ball pivot itself with the pivot connected thereto in order to prevent the pivot from rotating together with the nut. This is achieved in the prior-art embodiments mostly by providing a multitooth engagement (Torx), a hexagon socket, a hexagon insert, or the like, at the pivot pin on the inside or on the outside, by means of which an opposite torque can be achieved between the nut to be tightened or loosened and the pivot itself. However, it was found in practical use that the multitooth engagement is very often destroyed by, e.g., stones and weather effects, so that major problems occur at the time of the removal of the ball-and-socket joint. Since it is impossible to fix the ball pivot because of the destruction of the multitooth engagement and the thread at the pivot pin is also heavily contaminated and stiff due to the use of the vehicle, the entire cylindrical pivot rotates together with the nut after the loosening moment of the cylindrical pivot has been exceeded. Thus, loosening of the cylindrical pivot pin is hardly possible or is possible only with great difficulty.

SUMMARY AND OBJECTS OF THE INVENTION

The primary object of the present invention is to improve the prior-art ball pivot with a joint ball and with a pivot pin connected to the joint ball such that the ball pivot will be prevented from rotating during loosening or tightening of the ball pivot in a component of the motor vehicle.

According to the invention, a ball pivot of a ball-and-socket joint for motor vehicles is provided. The ball pivot has a joint ball and a pivot pin connected to the joint ball. A substantial part of the pivot pin is made nonround for preventing the ball pivot from rotating.

Thus, the invention provides that a ball pivot of a ball-and-joint socket for motor vehicles with a joint ball and with a pivot connected to the joint ball be further improved such that at least a substantial part of the pivot pin is made nonround. It is achieved due to this nonround design of a substantial part of the pivot pin that the pivot pin can be supported with respect to rotation in the motor vehicle component to which it is to be connected or is connected. To achieve this, the nonround part of the pivot pin must be located at least partially in the area of the opening of the motor vehicle component, through which the pivot pin of the ball pivot is inserted. This opening of the motor vehicle component may be, e.g., an elongated hole in the motor vehicle component or an opening designed corresponding to the nonround shape of the pivot pin. A multitooth engagement at the ball pivot or another possible securing against rotation of the ball pivot can be advantageously abandoned due to the nonround design of the part of the pivot pin extending into the opening of the motor vehicle component.

An advantageous variant of the nonround shape of the substantial part of the pivot pin may be the oval or angular design of the pivot, e.g., in the form of a square or polygon.

According to another advantageous variant of the ball pivot according to the present invention, the ball pivot may have a separate support surface between the ball pivot and the pivot pin, which support surface may be supported, e.g., against an opposite surface of the motor vehicle component, to which the ball pivot is to be connected, during tightening by means of a nut. Furthermore, it may be advantageous in this connection for the support surface to extend flatly and at right angles to the central axis of the pivot pin.

According to another advantageous embodiment of the ball pivot according to the present invention, at least part of the length of the pivot pin is provided with a connection contour. This may be, e.g., a thread, a force fit, a bayonet or another, similar, prior-art connection contour.

It is advantageous in the design of the contour for the cross-sectional area of the part of the pivot pin that has the connection contour—viewed in the cross section through the central axis of the pivot pin—to be located within the contour of the cross-sectional area of the nonround part of the pivot pin. In other words, in a cross section at right angles to the central axis of the pivot pin, the cross-sectional areas of the part of the pivot pin that carries the connection contour shall be advantageously located completely within the cross-sectional area of the nonround pant. It is thus guaranteed that the threaded part of the pivot pin can also be passed through all openings through which the nonround part of the pivot pin fits. Coaxial position of the two cross-sectional areas and viewing the cross-sectional areas in the direction of the central axis of the pivot pin of the ball pivot is assumed in this approach.

According to another advantageous embodiment of the ball pivot, the pivot pin has a notch or groove on the side located opposite the joint ball. As a result, it is advantageously possible to achieve a correct alignment of the ball pivot during the mounting of the ball pivot in the motor vehicle component or to facilitate such alignment.

According to another aspect of the object of the invention, it is suggested that the prior-art wheel suspension of a motor vehicle for the spring-loaded connection of at least one wheel to the frame or to the chassis of the motor vehicle with at least one shock-absorbing strut and at least one suspension arm be improved such that a ball-and-socket joint is provided as a nonpositive connection between at least one shock-absorbing strut and at least one suspension arm. This ball-and-socket joint may advantageously have a means for securing against rotation, as it is described in the preceding text or also in the following exemplary embodiments or in the claims.

It is apparent that the above-mentioned features of the present invention, which will be explained below, may be used not only in the combination described, but also in other combinations or alone, without going beyond the scope of the present invention.

Other features and advantages of the present invention appear from the following description of a preferred exemplary embodiment with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
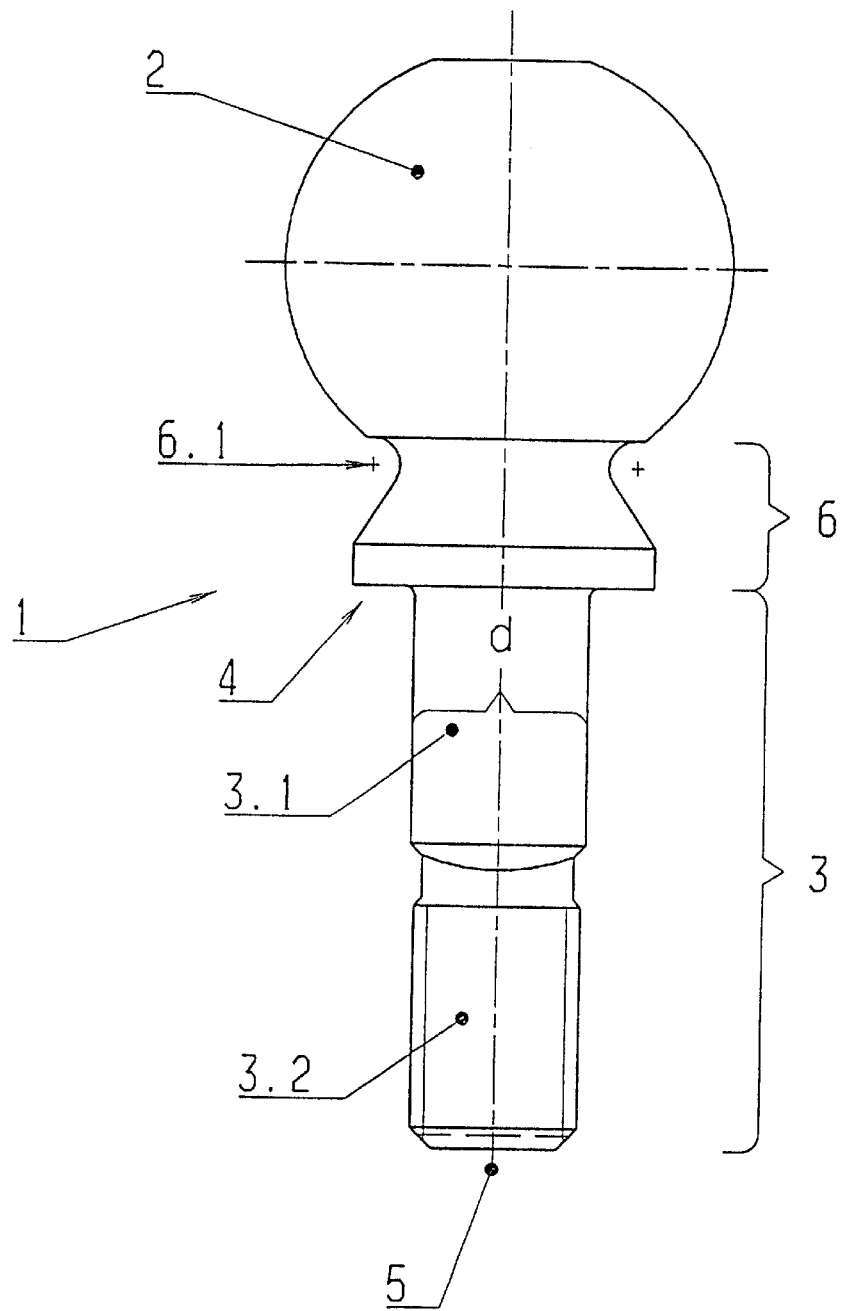
FIG. 1 is a view of a ball pivot in the direction of arrow I according to the representation in FIG. 3.
Figure 2:
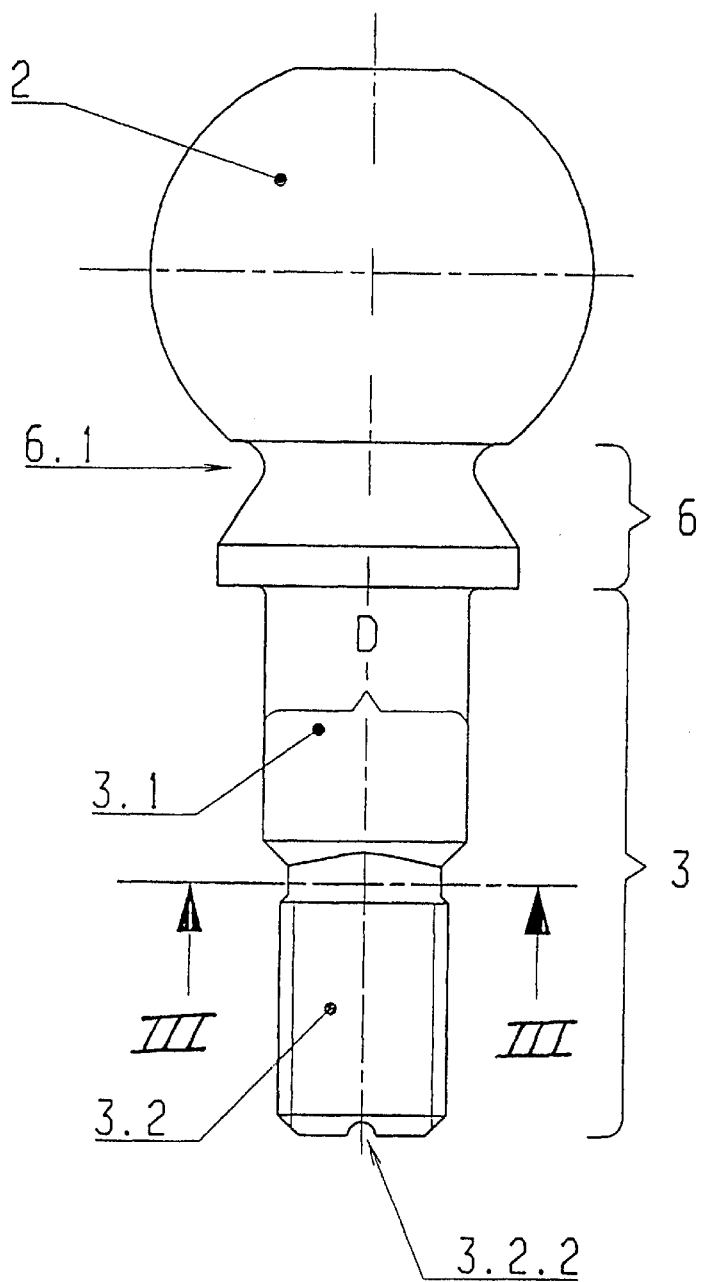
FIG. 2 is a view of a ball pivot in the direction of arrow II according to the representation in FIG. 3.
Figure 3:
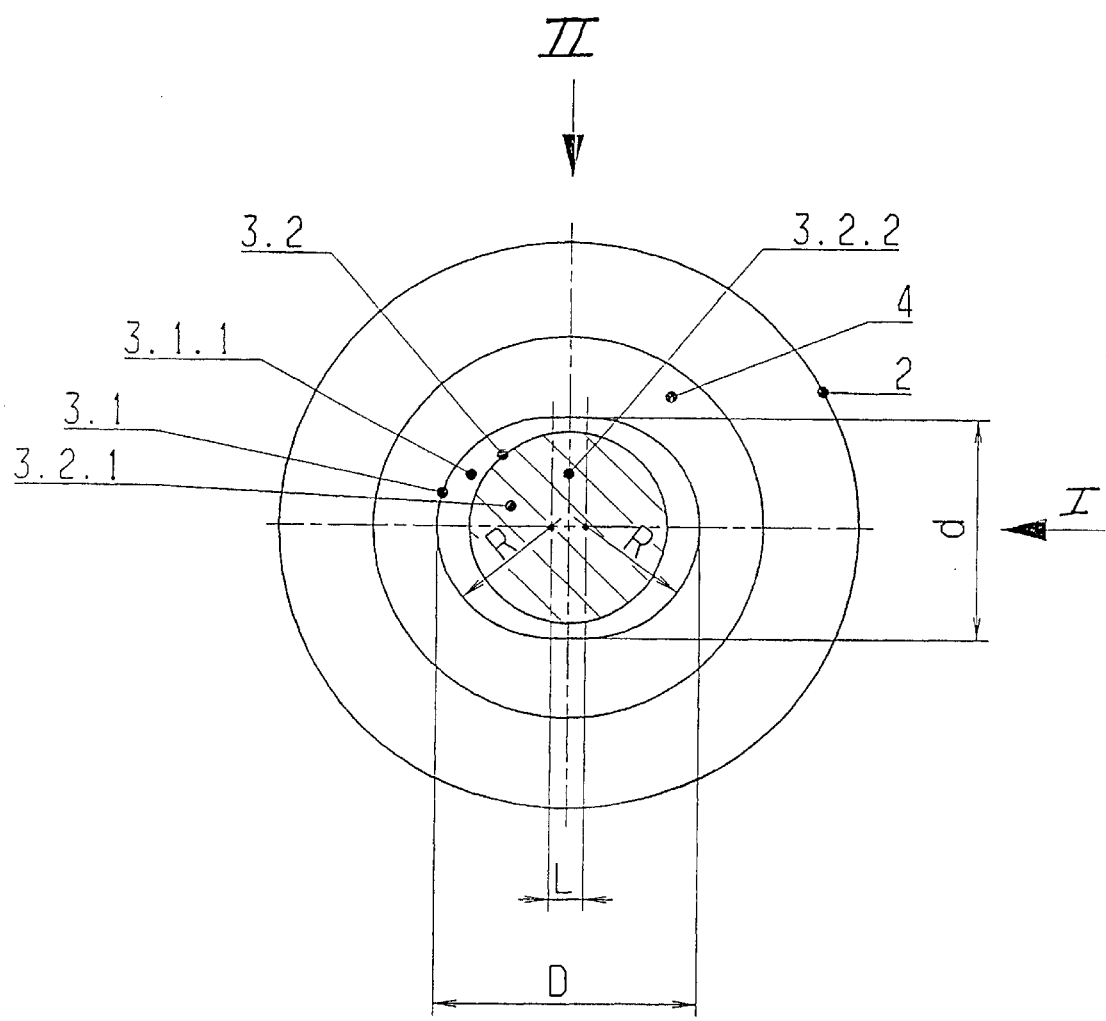
FIG. 3 is a cross sectional view taken along line III—III through a ball pivot according to the representation in FIG. 2.

Referring to the drawings in particular, FIGS. 1 through 3 show views I and II as well as section III—III through an exemplary embodiment of the ball pivot according to the present invention. In FIG. 1, view I shows the ball pivot 1 with the joint ball 2, arranged on top, which has a flattened area on its top side. On the underside of the joint ball 2 joins an piece 6 with a contraction 6.1. The intermediate piece 6 passes over into the pivot 3 proper. The contraction 6.1 of the intermediate piece 6 contributes to an increase in the radius of movement of the ball pivot. A support surface 4, which extends at right angles to the central axis 5 of the pivot, is located under the intermediate piece 6. The pivot 3 has two partial sections, namely, a first partial section 3.1 with a contour that is nonround according to the present invention (a nonround outer surface contour), and a second partial section threaded part 3.2, which has a connection contour, here external threads. The nonround partial section 3.1 of the pivot 3 is arranged between the support surface 4 and the threaded part 3.2 of the pivot.

FIG. 2 shows view II according to the representation in FIG. 3.

The contour of the cross-sectional area 3.1.1 of the nonround part 3.1 of the pivot pin 3 can be recognized especially well in FIG. 3, which shows the section III—III at right angles to the central axis 5 of the pivot pin 3. The contour has an approximately oval shape with a short distance "d" and a great distance "D." The round contour of the cross-sectional area 3.2.1. of the threaded part 3.2 of the pivot pin 3 is located in this view within the contour of the cross-section area 3.1.1, so that the pivot pin 3 can be introduced unhindered into a correspondingly shaped opening, e.g., that of a motor vehicle component, until it comes into contact with the support surface 4.

The groove 3.2.2 at the end of the pivot pin 3, which can be used as an orienting means for aligning the ball pivot during the mounting of the ball pivot, is additionally shown in FIGS. 2 and 3.

The width of the groove 3.2.2 is designated by "L." The following equation may be used to determine the approximate value of the dimensions of a ball pivot according to the present invention: D=2R+L, in which "R" is the radius of the semicircle of the approximately oval cross-sectional area 3.1.1. The radius of the semicircle on one side of the groove may, of course, differ from the radius on the other side of the groove. Consequently, it is not absolutely necessary to have the same value of "R" to embody the object of the present invention, so that asymmetric cross-section geometries of the cross-sectional area 3.1.1 are conceivable.

Figure 4:
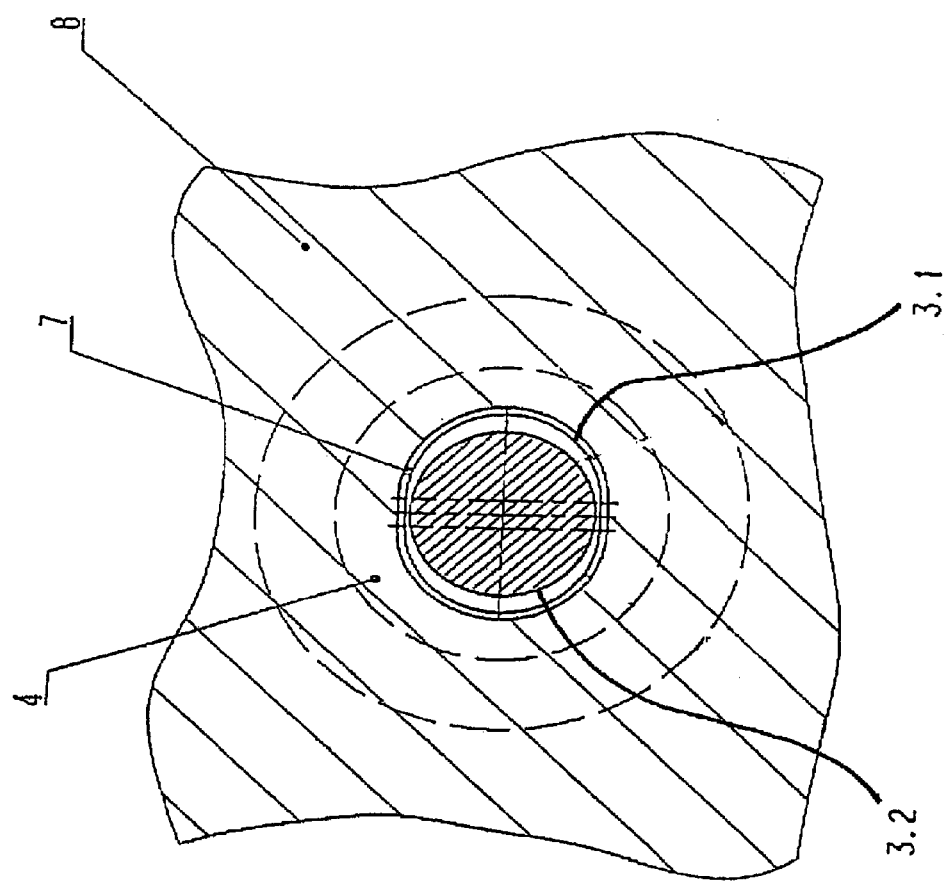
FIG. 4 is a cross sectional view through the motor vehicle component with ball pivot.

FIG. 4 shows a mounted situation of a ball pivot in a motor vehicle component 8. The motor vehicle component 8 drawn by shading has an elongated opening 7, which is engaged by the nonround part (nonround portion) 3.1 of the pivot 3. If the ball pivot 1 is fastened with a nut to the threaded part (connection portion) 3.2 of the pivot 3 at the motor vehicle component 8, the nonround contour (nonround outer surface contour) of the part 3.1 prevents the pivot from rotating in relation to the motor vehicle component 8 during the tightening or loosening of the nut. Thus, it is no longer necessary to equip the ball pivot 1 with a multitooth engagement or another means for preventing rotation at its end, and it is also possible to remove the pivot without difficulties after a prolonged time of use.

FIGS. 5 through 9 show a variant of the object of the present invention, namely, a wheel suspension of a motor vehicle, in which a ball-and-socket joint is provided as a nonpositive connection between the shock-absorbing strut and the suspension arm.

Figure 5:
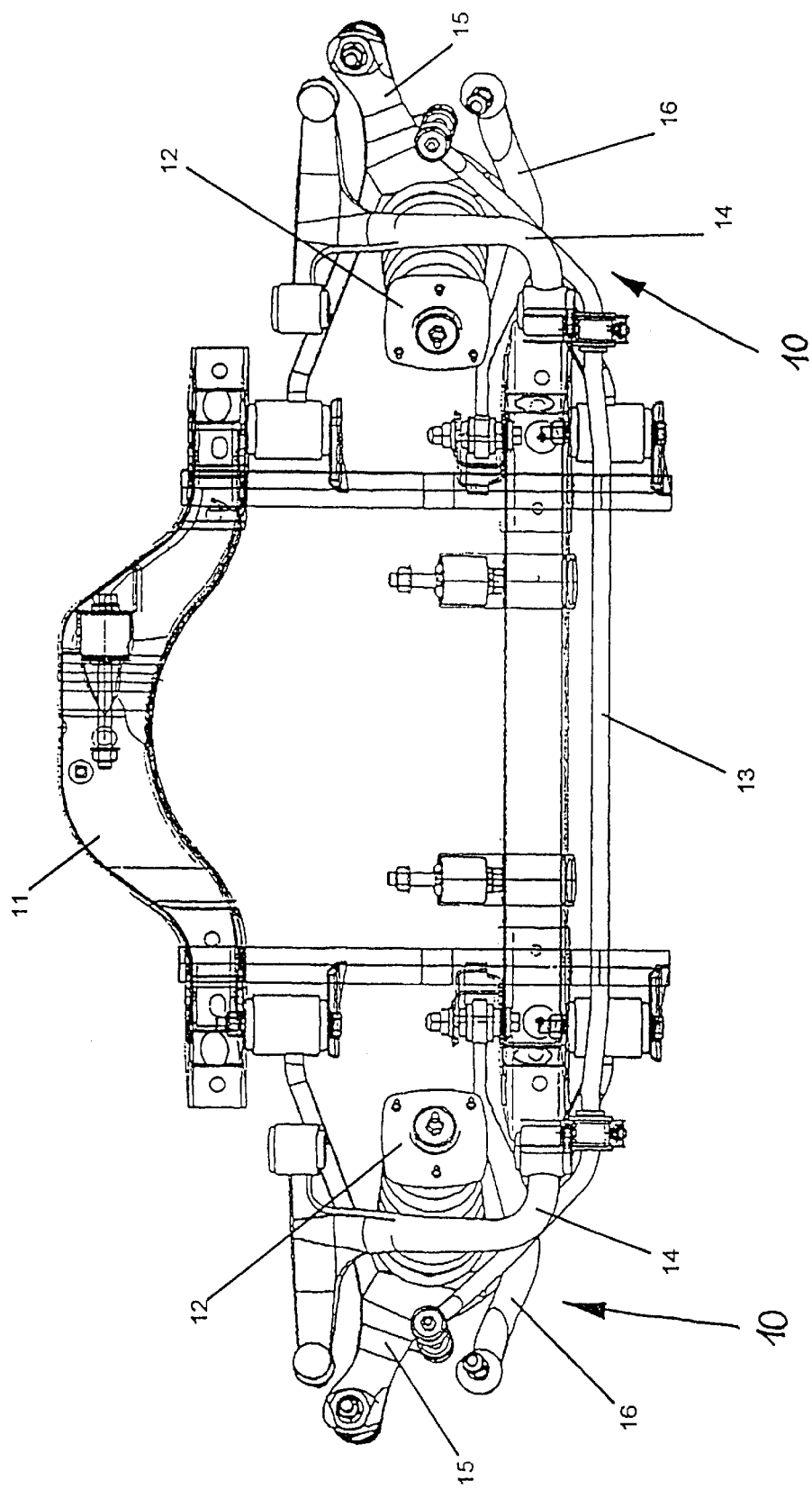
FIG. 5 is a top view of a wheel suspension.
Figure 6:
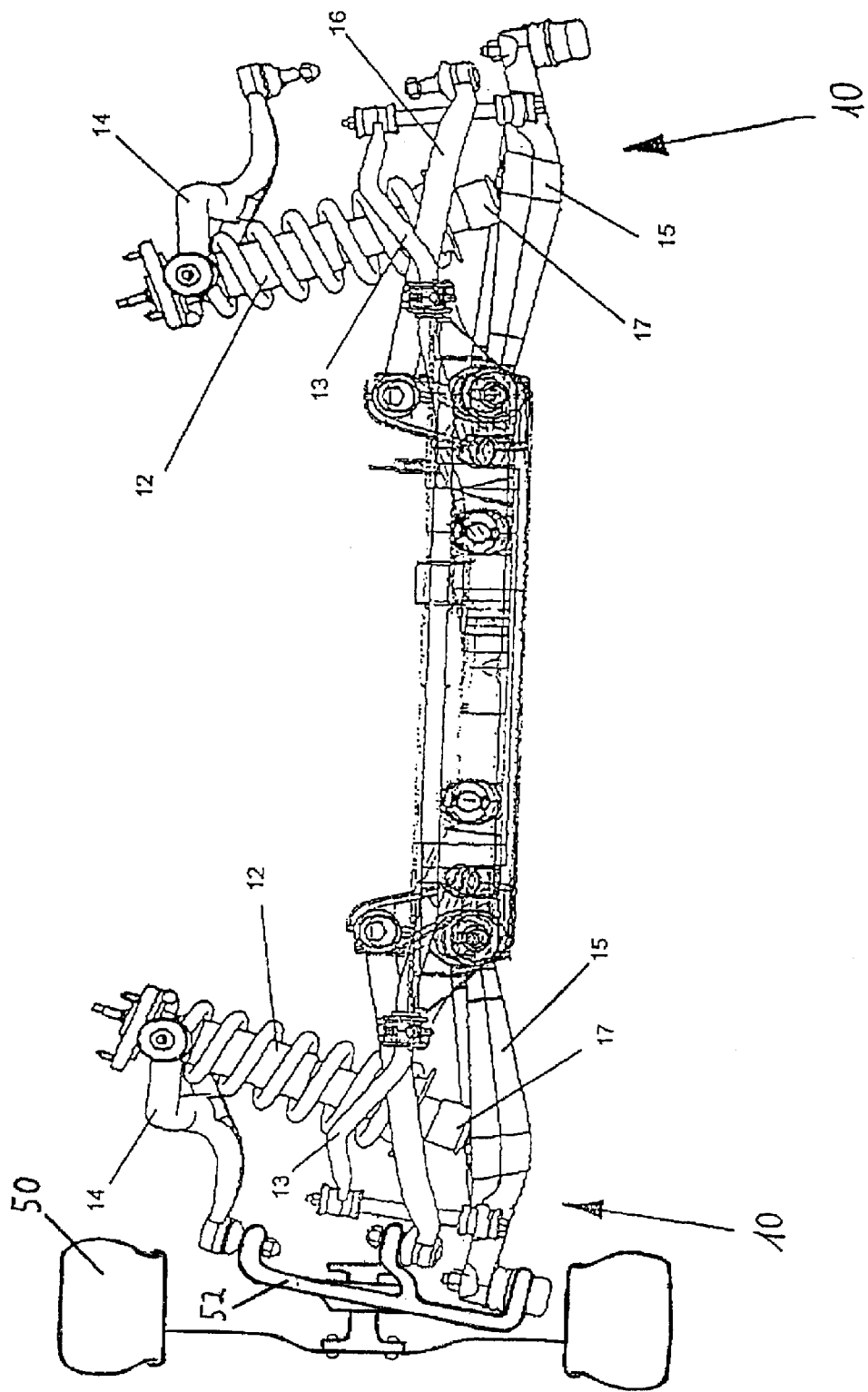
FIG. 6 is a front view of the wheel suspension according to FIG. 5.

FIGS. 5 and 6 show a top view and a front view, respectively, of an axle shown as an example with a wheel suspension from the top, with a partial view of the vehicle frame (chassis/or chassis connection) 11 of the motor vehicle. In the known manner, this wheel suspension comprises, per wheel 50 and wheel connection 52 to be suspended, wheel suspension components including an upper suspension arm 14, a lower suspension arm 15 and a tie rod 16, and a shock-absorbing strut (spring loaded connection) 12 connected to the lower suspension arm. The two suspension arms on the right and left are connected via a sway bar 13. The connection between the shock-absorbing strut (shock-absorbing strut motor vehicle component) 12 and the lower suspension arm (a suspension arm motor vehicle component) 15 is brought about according to the present invention by means of a ball-and-socket joint 17, in which an above-described ball pivot is preferably used in at least one ball-and-socket joint.

Figure 7:
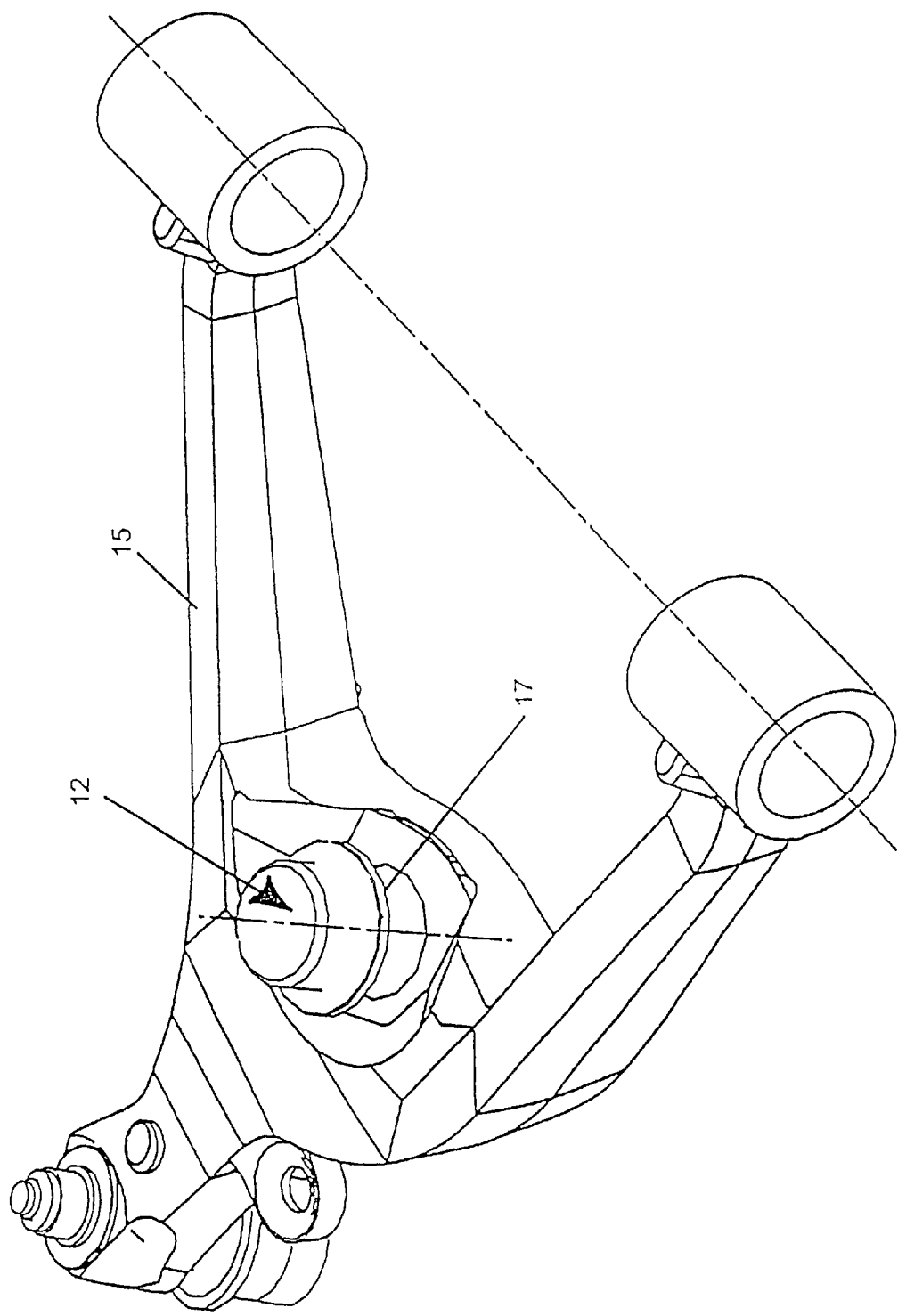
FIG. 7 is a view of the lower suspension arm.

FIG. 7 shows a detail view of a suspension arm 15 of the wheel suspension 10 with the ball-and-socket joint 17.

Figure 8:
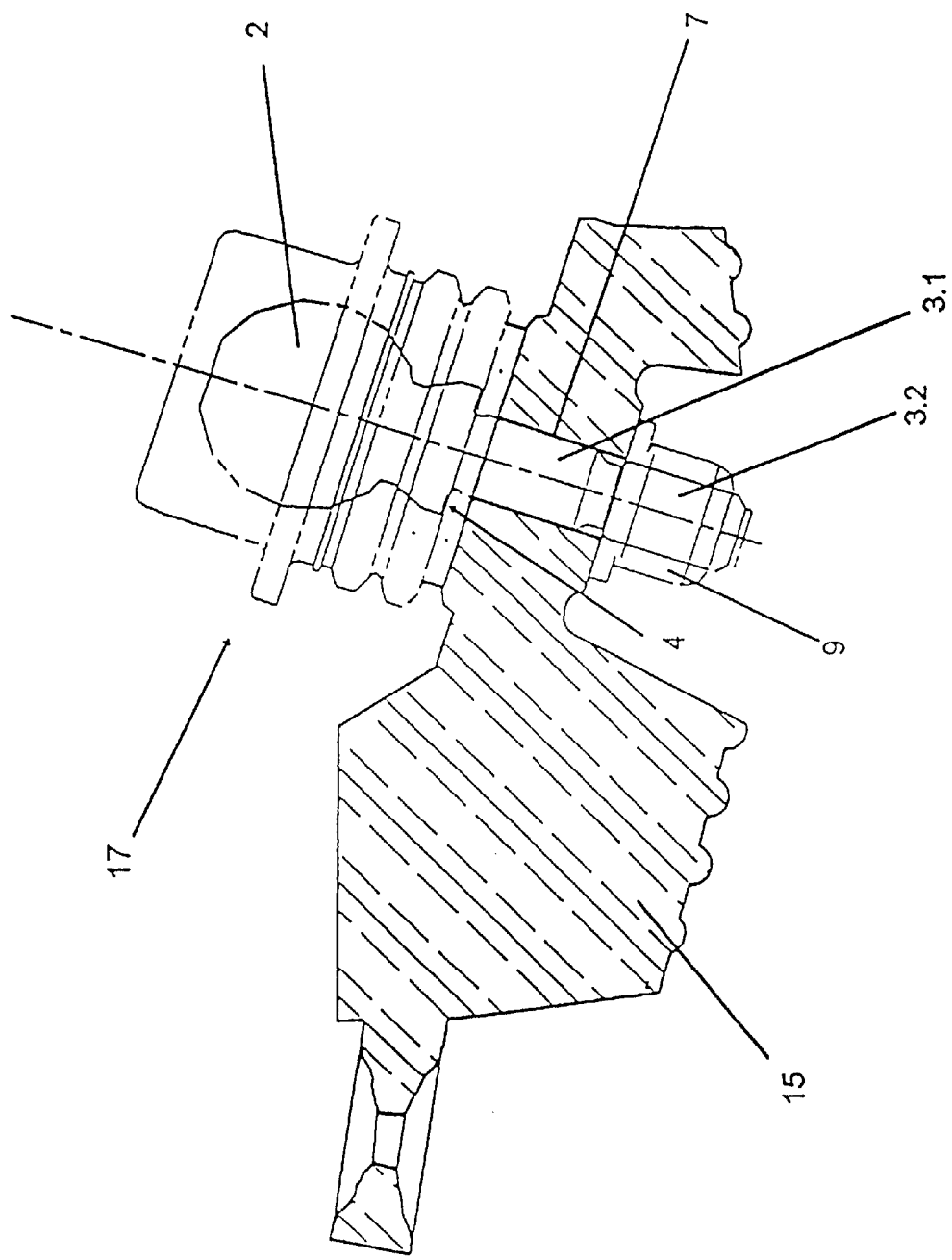
FIG. 8 is a detail view of the suspension arm with ball pivots.

FIG. 8 shows a section through the ball-and-socket joint 17 mounted in the suspension arm 15. The suspension arm 15 has an opening 7, into which the ball pivot 1 with the pivot 3 is inserted. With its support surface 4, the ball pivot 1 lies on the top side of the suspension arm. It is advantageous for the opening 7 to have different longitudinal and width extensions and for the pivot 3 of the ball-and-socket joint to be designed complementarily at least partially in this area of the opening 7. It is achieved as a result that the pivot can be supported with a partial surface of the nonround section of the pivot against a part of the wall of the opening for securing against rotation (i.e. a nonround inner surface). The nonround part 3.1 of the pivot 3 passes through the likewise nonround opening (a motor vehicle component opening) 7 of the suspension arm 15, and the threaded part 3.2 of the pivot 3 projects from the suspension arm 15 on the underside. A nut 9, which firmly connects the ball pivot 1 to the suspension arm 15, is screwed on the threaded part 3.2 of the pivot 3. Due to the above-described design of both the opening 7 in the motor vehicle component and of the pivot 3 of the ball pivot 1, the ball pivot 1 is prevented from rotating during the loosening of the nut 9, as a result of which reliable and problem-free loosening of the ball pivot 1 from the suspension arm 15 is possible without any other special measures for fixing the ball pivot 1. This is also particularly advantageous when the upper part of the ball pivot is covered by other components such that it cannot be prevented from rotating by means of tools.

Figure 9:
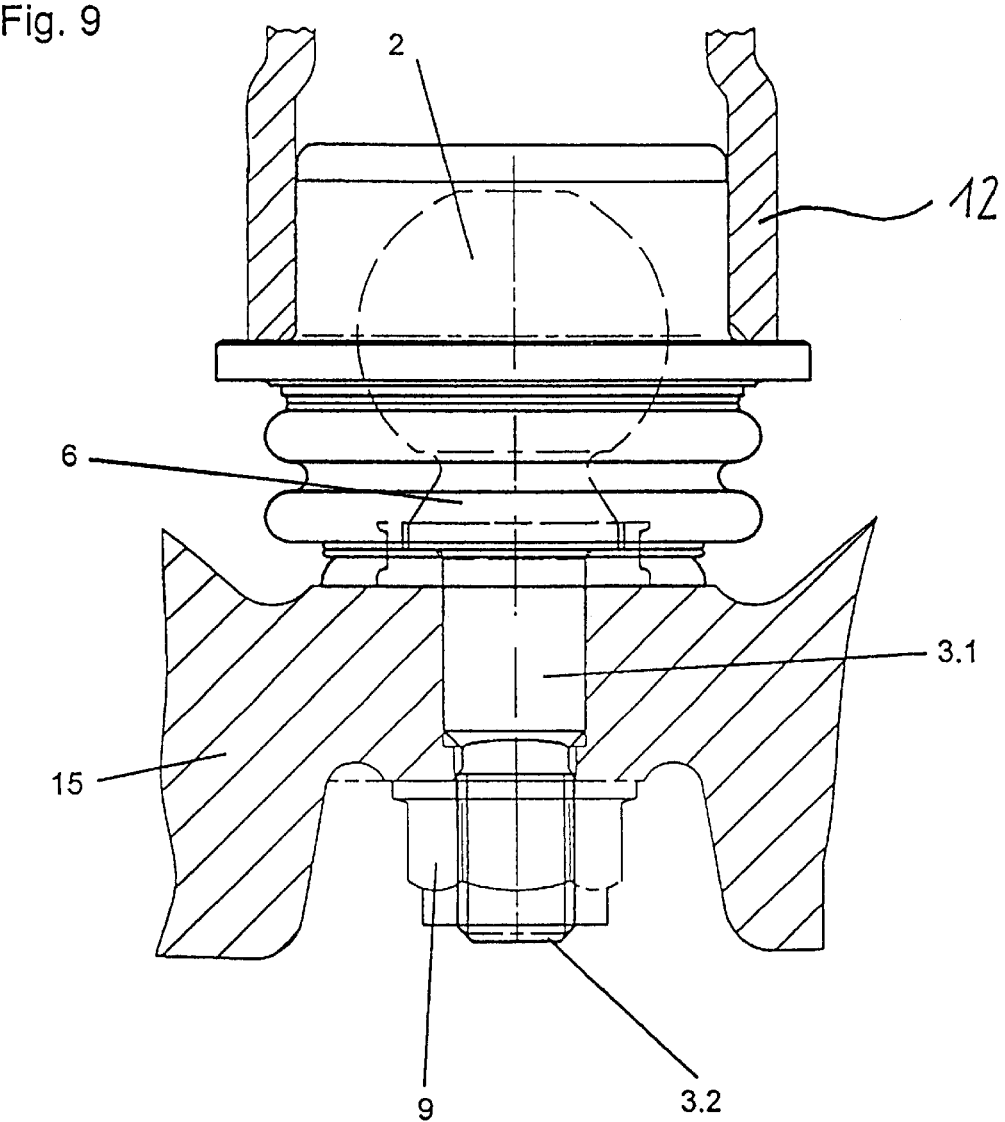
FIG. 9 is a cross sectional view of the ball pivot at the suspension arm.

The cross section through the ball pivot for fastening the shock-absorbing strut at the lower suspension arm 15 is again shown in detail in FIG. 9. The joint ball 2 with the intermediate piece 6, with the nonround part of the pivot 3:1 and with the threaded part 3.2 of the pivot can be seen as a shaded part. The threaded part 3.2 carries the nut 9, which presses the ball pivot with the support surface 4 against an opposite surface of the lower suspension arm and thus fastens it to the suspension arm 15. The nonround part of the pivot 3.1 may be designed as an oval according to the present invention, so that the ball pivot is prevented from rotating in relation to the suspension arm. It is, of course, also possible to design the nonround part 3.1 of the pivot pin 3 in the form of a square, so that rotation of the pivot within a likewise nonround opening can be prevented.

The embodiment of a wheel suspension, in which the connection between the shock-absorbing strut and the suspension arm is brought about by means of a ball pivot, is particularly advantageous even without a nonround partial section of the ball pivot, because an especially high degree of mobility of the shock-absorbing strut is achieved due to the ball pivot, and no tensions can be transmitted from the moving suspension arm into the shock-absorbing) arm as a result. However, the embodiment of the ball pivot with the above-described means for preventing rotation decisively improves the behavior of the wheel suspension, especially of the suspension arm and the shock-absorbing strut, during mounting and removal.

It is now possible with the embodiments shown, compared with the state of the art, to abandon a multitooth engagement (Torx) in the ball pivots, while the ball pivot is securely prevented at the same time from rotating during mounting and removal. Due to the use of a ball pivot as a fastening element for the shock-absorbing strut in a wheel suspension, it is, on the other hand, advantageously ensured, compared with the state of the art, that tensioning of the shock-absorption strut is avoided, because it is now fastened extensively freely movably to the suspension arm and better function of the shock-absorbing strut and the wheel suspension is thus achieved.

While specific embodiments of the invention have been shown and described in detail to illustrate the application of the principles of the invention, it will be understood that the invention may be embodied otherwise without departing from such principles.

APPENDIX

List of Reference Numbers

| | |
|---|---|
| 1 | The ball pivot |
| 2 | Joint ball |
| 3 | Pivot |
| 3.1 | Nonround part of pivot |
| 3.1.1 | Contour of the nonround part of the pivot |
| 3.2 | Threaded part of pivot |
| 3.2.1 | Contour of the threaded part of the pivot |
| 3.2.2 | Groove |
| 4 | Support surface |
| 5 | Centrat axis of pivot |
| 6 | Intermediate piece |
| 6.1 | Contraction |
| 7 | Opening in motor vehicle component |
| 8 | Motor vehicle component |
| 9 | Nut |
| 10 | Wheel suspension |
| 11 | Frame |
| 12 | Shock-absorbing strut |
| 13 | Sway bar |
| 14 | Upper suspension arm |
| 15 | Lower suspension arm |
| 16 | Tie rod |
| 17 | Ball-and-socket joint |

What is claimed is:

1. A wheel suspension of a motor vehicle for a spring-loaded connection of at least one wheel to a frame or chassis of the motor vehicle, the wheel suspension comprising:

a shock-absorbing strut;

a suspension arm;

a ball-and-socket joint provided as a nonpositive connection between at least said shock-absorbing strut and said suspension arm, said ball-and-socket joint having a ball pivot with a joint ball and a pivot pin connected to said joint ball, a substantial part of said pivot pin having a nonround cross-section, the cross-section being perpendicular to a longitudinal axis of the pivot pin, providing a nonround outer surface engaging one of a shock-absorbing strut opening and a suspension arm opening that has a nonround inner surface for preventing the ball pivot from rotating, said ball pivot having a support surface between said joint ball and said pivot.

2. The wheel suspension in accordance with claim 1, wherein said pivot pin has a central axis and said nonround part of the pivot pin is made oval or angular, said support surface extends substantially flatly and at right angles to said central axis of said pivot pin, said pivot pin has a connection contour over at least part of a length of said pivot pin wherein said connection contour is a threaded region or a force fit.

3. The wheel suspension in accordance with claim 1, wherein said wheel suspension has an upper and lower suspension arm.

4. The wheel suspension in accordance with claim 1, wherein said wheel suspension has at least one sway bar.

5. The wheel suspension in accordance with claim 1, wherein said wheel suspension has at least one tie rod.

6. The wheel suspension in accordance with claim 1, wherein said ball-and-socket joint includes the ball pivot with the pivot pin engaging said suspension arm.

7. The wheel suspension in accordance with claim 6, wherein said suspension arm is a lower suspension arm.

8. A ball pivot of a ball-and-socket joint for motor vehicles, the ball pivot comprising:
   a joint ball;
   a pivot connected to said joint ball, a substantial part of said pivot being nonround for preventing the ball pivot from rotating;
   a notch or groove at an end of said pivot located opposite said joint ball.

9. The wheel suspension in accordance with claim 1, in combination with at least one vehicle wheel and a vehicle frame or chassis, wherein said shock-absorbing strut, said suspension arm and said ball-and-socket joint form wheel suspension components for the spring-loaded connection of said wheel to said frame or chassis of the motor vehicle.

10. A wheel suspension, comprising:
    a ball-and-socket joint for motor vehicles, said ball-and-socket joint including a ball pivot with a joint ball and a pivot pin connected to said joint ball, a substantial part of said pivot having a nonround cross-section, the cross-section being perpendicular to a longitudinal axis of the pivot pin, providing a nonround outer surface;
    at least one vehicle wheel connection;
    a vehicle frame or chassis connection; and
    wheel suspension components for a spring-loaded connection of said wheel connection to said frame or chassis connection of the motor vehicle, said wheel suspension components including a shock-absorbing strut, a suspension arm and said ball-and-socket joint provided as a nonpositive connection between at least said shock-absorbing strut and said suspension arm, said nonround outer surface engaging an opening of one of said wheel suspension components with a nonround inner surface preventing the ball pivot from rotating.

11. A wheel suspension in accordance wit claim 10, wherein said nonround part of the pivot is made oval or angular, said ball pivot has a support surface between said joint ball and said pivot, said support surface extends substantially flatly and at right angles to said central axis of said pivot, said pivot has a connection contour over at least part of a length of said pivot wherein said connection contour is a threaded region or a force fit.

12. A wheel suspension in accordance with claim 10, wherein said wheel suspension components include an upper suspension arm, at least one sway bar, at least one tie rod and said suspension arm is a lower suspension arm with said opening with nonround inner surface and said pivot pin engages said lower suspension arm.

13. A wheel suspension of a motor vehicle for a spring-loaded connection of at least one wheel to a frame or chassis of the motor vehicle, the wheel suspension comprising:
    a shock-absorbing strut;
    a suspension arm;
    a ball-and-socket joint provided as a nonpositive connection between at least said shock-absorbing strut and said suspension arm, said ball-and-socket joint having a ball pivot with a joint ball and a pivot pin connected to said joint ball, a substantial part of said pivot pin having an oval or angular cross-section, the cross-section being perpendicular to a longitudinal axis of the pivot pin, said ball pivot having a support surface between said joint ball and said pivot pin, said substantial part of said pivot pin engaging one of a shock-absorbing strut opening and a suspension arm opening that has a nonround inner surface.

14. The wheel suspension in accordance with claim 13, further comprising:
    at least one vehicle wheel and a vehicle frame or chassis, wherein said shock-absorbing strut, said suspension arm and said ball-and-socket joint form wheel suspension components for the spring-loaded connection of said wheel to said frame or chassis of the motor vehicle.

15. A wheel suspension, comprising:
    a ball-and-socket joint for motor vehicles, said ball-and-socket joint including a ball pivot with a joint ball and a pivot pin connected to said joint ball, a substantial part of said pivot having an oval or angular cross-section, the cross-section being perpendicular to a longitudinal axis of the pivot pin;
    at least one vehicle wheel connection;
    a vehicle frame or chassis connection; and
    wheel suspension components for a spring-loaded connection of said wheel connection to said frame or chassis connection of the motor vehicle, said wheel suspension components including a shock-absorbing strut, a suspension arm and said ball-and-socket joint provided as a nonpositive connection between at least said shock-absorbing strut and said suspension arm with said oval or angular cross-section engaging one of a shock-absorbing strut opening and a suspension arm opening that has a nonround inner surface preventing the ball pivot from rotating.

16. A wheel suspension of a motor vehicle for a spring-loaded connection of at least one wheel to a frame or chassis of the motor vehicle, the wheel suspension comprising:
    a shock-absorbing strut motor vehicle component;
    a suspension arm motor vehicle component;
    a ball-and-socket joint provided as a nonpositive connection between at least said shock-absorbing strut motor vehicle component and said suspension arm motor vehicle component, said ball-and-socket joint having a ball pivot with a joint ball and a pivot pin connected to said joint ball, a substantial part of said pivot pin having a nonround cross-section, the cross-section being perpendicular to a longitudinal axis of the pivot pin, providing a nonround outer surface for preventing the ball pivot from rotating, said ball pivot having a support surface between said joint ball and said ball pivot, wherein said substantial part is located at least partially in a motor vehicle component opening and said motor vehicle component opening has a nonround inner surface.

17. The wheel suspension in accordance with claim 16, in combination with at least one vehicle wheel and a vehicle frame or chassis, wherein said shock-absorbing strut motor vehicle component, said suspension arm motor vehicle component and said ball-and-socket joint form wheel suspension components for the spring-loaded connection of said wheel to said frame or chassis of the motor vehicle wherein said motor vehicle component opening is in said suspension arm motor vehicle component.

18. A Wheel suspension of a motor vehicle for a spring-loaded connection of at least one wheel to a frame or chassis of the motor vehicle, the wheel suspension comprising:
    a shock-absorbing strut;
    a suspension arm;
    a ball-and-socket joint provided as a nonpositive connection between at least said shock-absorbing strut and said suspension arm with one of said shock-absorbing strut and said suspension arm having an opening with a nonround inner surface, said ball-and-socket joint having a ball pivot with a joint ball and a pivot pin connected to said joint ball, said pivot pin having a nonround portion having a nonround cross-section, the cross-section being perpendicular to a longitudinal axis of the pivot pin, providing a nonround outer surface contour engaging said opening nonround inner surface for preventing the ball pivot from rotating and said pivot pin having a connection portion with a connection contour, said connection contour being within said nonround outer surface contour whereby said connection contour can pass through openings dimensioned corresponding to said nonround outer surface contour.

19. The wheel suspension in accordance with claim 18, wherein said nonround portion of said pivot pin is located at least partially in a motor vehicle component opening.

20. The wheel suspension in accordance with claim 19, in combination with at least one vehicle wheel and a vehicle frame or chassis, wherein said shock-absorbing strut, said suspension arm and said ball-and-socket joint form wheel suspension components for the spring-loaded connection of said wheel to said frame or chassis of the motor vehicle wherein said motor vehicle component opening is in said suspension arm and wherein said motor vehicle component opening has a nonround inner surface dimensioned substantially corresponding to said nonround outer surface contour.

* * * * *